United States Patent
Bauer et al.

(10) Patent No.: US 8,962,138 B2
(45) Date of Patent: Feb. 24, 2015

(54) ORGANICALLY FUNCTIONALIZED POLYSILOXANE NANOPARTICLES, METHOD FOR THE PRODUCTION THEREOF, AND USE THEREOF

(75) Inventors: Monika Bauer, Koenigs Wusterhausen (DE); Hans-Juergen Glaesel, Leipzig (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 340 days.

(21) Appl. No.: 13/377,064

(22) PCT Filed: Jun. 10, 2010

(86) PCT No.: PCT/EP2010/058172
§ 371 (c)(1),
(2), (4) Date: Dec. 8, 2011

(87) PCT Pub. No.: WO2010/142769
PCT Pub. Date: Dec. 16, 2010

(65) Prior Publication Data
US 2012/0082850 A1 Apr. 5, 2012

(30) Foreign Application Priority Data

Jun. 12, 2009 (DE) .......................... 10 2009 024 754
Feb. 12, 2010 (DE) .......................... 10 2010 007 779

(51) Int. Cl.
| | | |
|---|---|---|
| B32B 5/16 | (2006.01) | |
| C08G 77/04 | (2006.01) | |
| C08G 77/06 | (2006.01) | |
| C08G 77/20 | (2006.01) | |
| C08G 77/54 | (2006.01) | |
| C08G 77/62 | (2006.01) | |
| C08K 5/544 | (2006.01) | |
| C08L 33/18 | (2006.01) | |

(52) U.S. Cl.
CPC ............... *C08G 77/04* (2013.01); *C08G 77/54* (2013.01); *C08G 77/62* (2013.01); *C08K 5/544* (2013.01); *C08L 33/18* (2013.01)
USPC ............ 428/402; 428/403; 428/407; 428/447

(58) Field of Classification Search
CPC ...... C08L 83/04; C08L 33/18; C08L 2666/48
USPC .................................. 428/402, 403, 407, 447
See application file for complete search history.

(56) References Cited

U.S. PATENT DOCUMENTS 4,935,484 A * 6/1990 Wolfgruber et al. ............ 528/34
5,466,767 A * 11/1995 Wieland et al. .................... 528/9

(Continued)

FOREIGN PATENT DOCUMENTS

EP 0 291 939 A2 5/1988
WO WO 2005/082994 A1 9/2005

*Primary Examiner* — Holly Le
(74) *Attorney, Agent, or Firm* — Duane Morris LLP

(57) ABSTRACT

The present invention relates to polysiloxane nanoparticles having the following properties: an average particle size $d_{50}$ (measured using REM recordings) in the range of 10-200 nm, a specific surface area $A_o$ of at least 50 m²/g, a pore volume of at least 0.2 cm³/g, an average pore volume $d_{50}$ of at least 0.8 nm, wherein the particles have groups that contain carbon, which groups are bonded to the silicon at least partially in the form of unsubstituted or substituted alkyl, alkenyl, aryl, arylalkyl, or alkylaryl groups. Said polysiloxane nanoparticles can be produced, among other things, in that either a silazane or a mixture of different silazanes having one or more —[Si(R)(R¹)—NR²]— units and/or a silane or a mixture of different silanes having the formula R'$_x$—SiX$_{4-a}$ or an oligosiloxane obtainable by means of hydrolytic condensation of said silane/said silanes or a mixture of such oligosiloxanes are provided in a solvent and brought in contact with a strongly alkaline medium in such a way that the pH is not below 13 after the addition thereof. In specific embodiments, synthesis in acid is also successful.

24 Claims, 4 Drawing Sheets

(56) References Cited

U.S. PATENT DOCUMENTS

| | | | |
|---|---|---|---|
| 6,689,468 B2 * | 2/2004 | Edelmann et al. | 428/403 |
| 2006/0089478 A1 * | 4/2006 | Noda | 528/10 |
| 2007/0112242 A1 | 5/2007 | Edmiston | |
| 2007/0178263 A1 | 8/2007 | Guilleux et al. | |
| 2008/0188032 A1 * | 8/2008 | Rantala | 438/82 |
| 2010/0112338 A1 | 5/2010 | Bauer et al. | |
| 2010/0129750 A1 | 5/2010 | Briehn et al. | |

\* cited by examiner

ORGANICALLY FUNCTIONALIZED POLYSILOXANE NANOPARTICLES, METHOD FOR THE PRODUCTION THEREOF, AND USE THEREOF

The present invention pertains to organically functionalized polysiloxane nanoparticles with defined specific surface areas, pore volumes, pore diameters and organic components. The present invention also pertains to a method, with which [sic, "denen" should be "dem"-Tr.Ed.] such nanoparticles can be produced, as well as to their use as fillers in plastic materials, which significantly affect both the chemical and the physical properties of these materials or their intermediate products.

Polysiloxane particles are well known. They can be produced, for example, via the Stöber method. They are desired, since they can be produced as relatively small parts (an example is the powder commercially available by the name Aerosil®) and thus have large surface areas. Therefore, they can be advantageously used in many different applications, and especially as fillers.

Polysiloxane nanoparticles with high surface area, large pore volume, but at the same time not too small pore diameters and a pronounced hydrophobicity are especially desirable.

Surprisingly, the inventors of the present application were able to obtain organically functionalized polysiloxane nanoparticles, whose physical properties make [sic] them especially suitable not only as fillers or, in a large number of cases, as base materials for, e.g., superhydrophobic moldings, but also which act as polyreaction accelerators and especially as polymerization accelerators because of their intrinsic structure when incorporated into polymers or their precursors, and especially when used in precondensates subsequently curable into duromers.

Accordingly, the present invention provides organically functionalized polysiloxane nanoparticles with the following properties:
- an average primary particle size ($d_{50}$) (measured using REM recordings) in the range of 10 nm to 200 nm, and preferably in the range of 70 nm to 130 nm, wherein these particles may be present as agglomerates with a diameter of up to 500 μm, and preferably of up to 200 μm,
- a specific surface area $A_o$ of at least 50 m$^2$/g, preferably of at least 100 m$^2$/g, and especially preferably of 200 m$^2$/g, measured using the BET method,
- a pore volume of at least 0.2 cm$^3$/g, preferably of at least 0.5 cm$^3$/g and especially preferably of at least 0.7 cm$^3$/g, measured using the BET method,
- an average pore diameter ($d_{50}$) of at least 0.8 nm, preferably of at least 1.0 nm and especially preferably of at least 1.25 nm, measured using the BET method,
- in a number of cases with a portion of, on average, a maximum of 3.5 carbon atoms per silicon atom, wherein more than one carbon atom may be present directly bonded to usually no more than 80%, preferably to no more than 60% and especially preferably to no more than 40% of the silicon atoms,
- wherein these carbon atoms are at least partially, and preferably entirely, bonded to the silicon in the form of unsubstituted or, in specific embodiments, substituted and especially fluorinated alkyl, alkenyl, aryl, arylalkyl and alkylaryl groups and
- wherein these particles preferably have a contact angle to water of at least approx. 100°, more preferably of at least 110°, even more preferably of at least 120° and in specific cases a contact angle of at least 135° or even higher. The latter are superhydrophobic.

BRIEF DESCRIPTION OF THE DRAWINGS

FIG. 4 shows a drop of water on a surface made of n-octadecylpolysiloxane nanoparticles in Example 26a.

Figure 1A:
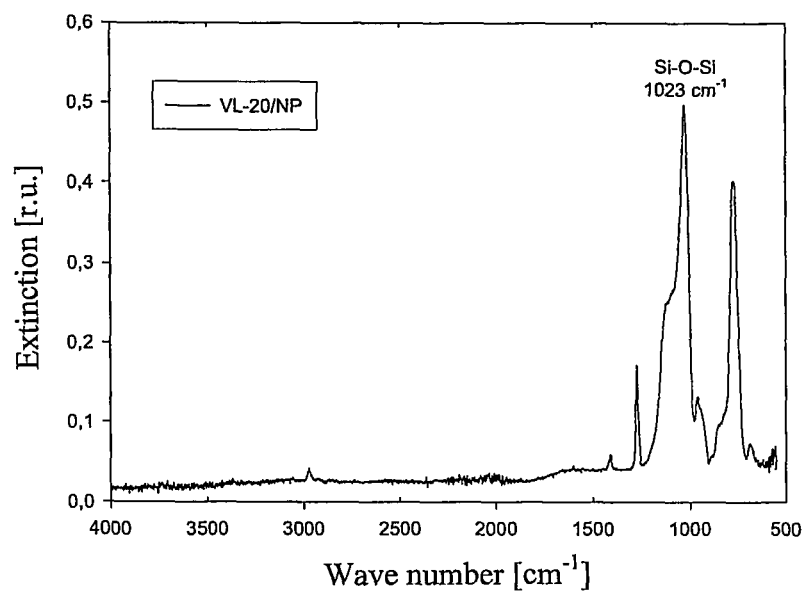
FIG. 1a shows the FT-IR spectra of the product in Example 2.

The particles according to the present invention can be produced by correspondingly substituted silazanes, cyclic or open-chain polysilazanes, silanes, oligomeric siloxanes, mixtures of such (poly) silazanes, or silanes/oligomeric siloxanes or in exceptional cases mixtures of (poly)silazanes with silanes/oligomeric siloxanes being dissolved in a solvent and being brought into contact with a highly alkaline medium. Here, if (poly)silazanes are used as starting materials, these shall have, on average, a portion of a maximum of 3.5 carbon atoms per silicon atom, wherein more than one carbon atom may be present bonded to usually no more than 80%, preferably to no more than 60%, and especially preferably to no more than 40% of the silicon atoms. Moreover, starting from the above-mentioned silanes/siloxanes, the production is successful in an acidic environment. One possibility here is acidic autocatalysis, in which halogen silanes (especially chlorosilanes) are used, from which HX (with X being halogen) is free in the presence of water which drastically accelerates the hydrolysis of other Si—X bonds. Instead of this, the reaction may also take place in an acidic environment (pH of 4 at the most, preferably of 3 at the most and especially favorably of 2 at the most), as explained in detail further below.

It turned out that silazanes and silanes cannot be used equally as starting materials in all cases. In those cases, in which more than 45% of the silicon atoms have two or more carbon atoms in the particles produced, the carbon content shall possibly be even lower than in the above-mentioned maximum 3.5 carbon atoms per silicon atom, especially at approx. 2.0:1 at the most, provided that the particles are produced from silazanes. Inversely, it is possible that the carbon content per silicon atom in the particles may be higher or even considerably higher than in the above-mentioned ratio of up to 3.5 C:1 Si, and when the particles are produced at least partially and preferably entirely from silanes. In this way, the inventors were able to provide particles with a considerably higher C:Si ratio, especially in the range of up to 18:1 and even higher (see Example 29, which shows the production of particles with an atomic ratio of 30 C:1 Si).

In principle, suitable as starting materials are all silazanes with the unit —Si(R)(R$^1$)—NR$^2$— or all silanes with formula R'$_a$SiX$_{4-a}$, in which R and R$^1$, in the case of mixed synthesized silazanes with several different units —Si(R)(R$^1$)—NR$^2$—, may be the same or different in each of the different units as well as in one and the same unit and denote an unsubstituted or (in specific cases) substituted alkyl, alkenyl, aryl, arylalkyl, alkylaryl or hydrogen, R$^2$ is preferably hydrogen, but may also be alkyl, R' is the same or different and an unsubstituted or (in specific cases) substituted alkyl, alkenyl, aryl, arylalkyl, or alkylaryl, X is a group hydrolytically condensable from the silicon under hydrolysis conditions while forming an Si—O—Si group, e.g., halogen, acyloxy, alkylcarbonyl, alkoxycarbonyl or $NR^3$ with $R^3$ equal to hydrogen, alkyl (preferably with 1 to 4 carbon atoms) or aryl, but especially an alkoxy group with preferably 1 to 6, especially preferably 1 or 2 carbon atoms or is OH, and a is 0, 1 or 2, provided that the radicals R, $R^1$ and $R^2$ in the silazanes are selected such that the above conditions regarding the percentage of silicon atoms, which may not carry more than one carbon atom, and possibly regarding the relationship of carbon atoms to silicon atoms is [sic, are-Tr.Ed.] met. Instead of the above-mentioned silanes, oligosiloxanes obtainable, e.g., by means of hydrolytic condensation of these silanes, may also be used. As heteroatoms of the substituted groups, fluorine atoms are especially suitable. Very highly hydrophobic and some even superhydrophobic particles can be produced from partially or entirely fluorinated silanes with preferably a equal to 1 and with a radical R' with a number of more than 6 carbon atoms and (independently thereof or in combination) preferably alkoxy groups such as methoxy or ethoxy as leaving groups X.

Linear and/or cyclic polysilazanes or polysilazane mixtures of silazanes of the formula (V) may be mentioned as examples of the variability of the silazanes that are suitable as starting materials,

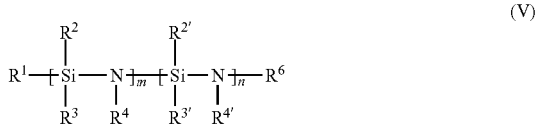

(V)

in which
(a) $R^2$ and $R^3$ are the same or different and denote hydrogen or straight-chain, branched or cyclic, substituted or—preferably—unsubstituted alkyl, alkenyl, aryl, arylalkyl or alkylaryl, wherein each of the substituents $R^2$ and $R^3$ may have a different meaning if m is greater than 1 in various units, but preferably has the same meaning,
$R^{2'}$ and $R^{3'}$ are the same or different and denote straight-chain, branched or cyclic, substituted or—preferably—unsubstituted alkyl, alkenyl, aryl, arylalkyl, alkylaryl or arylalkenyl, in which each of the substituents $R^{2'}$ and $R^{3'}$ may have a different meaning if n is greater than 1 in various units, but preferably has the same meaning,
or
(b) $R^2$ and $R^{2'}$ have the meaning indicated above and (in the presence of at least one radical $R^3$ and of at least one radical $R^{3'}$) all or some of the radicals $R^3$ and $R^{3'}$ may together represent an unsubstituted or substituted, straight-chain or branched alkylene group with preferably two bridging carbon atoms, wherein possibly the remaining part of the radicals $R^3$ and $R^{3'}$ has the meaning indicated under (a), and in which
$R^4$ and $R^{4'}$ preferably denote hydrogen, but may instead also be an alkyl and then preferably methyl, less preferably ethyl, $R^1$ and $R^6$ are the same or different and may have the same meaning as $R^2$ and $R^3$ according to clause (a), in which $R^6$ may, moreover, also denote $Si(R^1)(R^{2'})(R^{3'})$, or $R^1$ and $R^6$ together represent a single bond,
m is 1, 2, 3, 4, 5, 6, 7, 8, 9, 10 or an integer between 11 and 25,000, and preferably between 11 and 200, and n is 0, 1, 2, 3, 4, 5, 6, 7, 8, 9, 10 or an integer between 11 and 25,000, and preferably between 11 and 200,
wherein the units set in brackets may be preferably randomized, in other cases, instead, distributed in blocks and possibly, as an alternative, uniformly in the respective molecule, provided that the silicon substituents $R^1$, $R^2$, $R^3$, $R^6$, $R^{2'}$ and $R^{3'}$ are selected, such that in all of the compounds used, the above conditions regarding the C:Si ratio and the number of groups bound to the silicon are met.

Examples are polysilazanes or mixtures of polysilazanes, which carry 40% to 100% —Si(R)($R^1$)—NH units, in which R denotes an alkyl radical or alkenyl radical with 1 up to 7 carbon atoms and $R^1$ denotes hydrogen, and 0% to 40% —Si(R)($R^1$)—NH— units, in which R and $R^1$ denote an alkyl radical or alkenyl radical with 1 to 4 carbon atoms, in which, of course, R may then only have 7 carbon atoms, when the respective polysilazane consists of 100% of the first-mentioned unit. Especially preferred are silazanes with up to 80%, even more preferably with up to 60% and less, especially preferably with up to 40% —Si(R)($R^1$)—$NR^2$— units, in which both radicals R and $R^1$ are a methyl group or one radical is a methyl group and the other radical is a $C_1$-$C_3$ alkyl or alkylene group, especially either a vinyl group or likewise a methyl group, in combination with at least 20%, preferably at least 40% and especially preferably at least 60% units, in which one of the two said radicals is hydrogen and the other one is selected, such that the above atomic ratios are met.

Examples are:

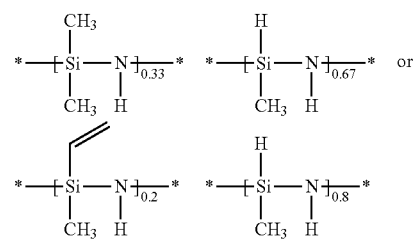

The following examples of silanes may be mentioned: Silanes of the formula $R'_a SiX_{4-a}$, in which R' is an alkyl or alkenyl with 1 to 8, preferably up to 12 or more, e.g., up to 18 or up to an even higher number of carbon atoms and a is 1, wherein not only, but especially when the carbon content of these silanes is high, these can be used in combination with silanes of the formula $SiX_4$, and in all cases X is defined as above for the silanes and is preferably alkoxy with 1 to 4 carbon atoms, and especially methoxy or ethoxy. As an alternative, for example, silanes of the formula $R'_a SiX_{4-a}$ with a equal to 2 may be used, in which one radical R' is equal to alkyl (e.g., methyl) or alkenyl (e.g., vinyl) and the other radical R' is alkyl (e.g., methyl or ethyl) (all said radicals R' with preferably 1-12, more preferably 1-6 carbon atoms). The radicals R' may be the same or different here; these silanes may also be "diluted" with a tetraalkoxysilane, e.g., tetramethoxy- or tetraethoxysilane as described above for the silanes with the formula $R_a SiX_{4-a}$ [sic-$R'_a SiX_{4-a}$?-Tr.Ed.] in which a is equal to 1.

When silanes are used, it may be independent of whether their carbon chain(s) is/are unsubstituted or substituted (for example, partially or entirely fluorinated), the particles according to the present invention are also obtained in an acidic medium or by means of autocatalysis instead of by highly basic hydrolytic condensation. The former can be carried out, for example, with silanes, whose hydrolytically condensable groups X are alkoxy groups such as methoxy or ethoxy, by a solution or suspension of the corresponding silane being brought into contact with an acidic medium such as citric acid (at approx. pH 3), acetic acid (at approx. pH 2) or in an even more acidic medium such as hydrochloric acid (approx. pH 1). The latter succeeds especially when silanes of formula $R'_aSiX_{4-a}$ are used as starting materials, in which a is equal to 1, the radical R' has more than 6 carbon atoms, and X is a halide such as Cl.

Provided that the particles according to the present invention were obtained under highly alkaline conditions, they are meltable. This has the advantage over particles produced by acidic autocatalysis that they can subsequently be converted into moldings. Provided that such particles are highly hydrophobic or even superhydrophobic, such highly hydrophobic or superhydrophobic moldings consisting of these siloxanes can for the first time be obtained in this way. By contrast, particles produced in an acidic medium or by acidic autocatalysis cannot melt even at 150° C.; however, they are sinterable. This is probably due to the fact that the hydrolysis is faster during alkaline catalysis, on the other hand, the condensation is slow, such that the molar masses in the particles produced in an alkaline medium are smaller than those of the particles produced in an acidic medium as a result of a higher number of chain terminations.

The starting materials are, if necessary, mixed in the portions corresponding to the conditions of the present invention and dissolved in a suitable solvent, for example, in an alcohol such as isopropyl alcohol. Suitable as bases are strong proton acceptors that are present especially in aqueous systems, e.g., sodium hydroxide or potassium hydroxide, with which the solution, after complete addition, can be brought to a final pH of at least 13, and preferably of approx. 14, wherein preferably the base is added first slowly, for example, it is added in drops, in order to avoid a too strong boiling of the reaction mixture, but then it is added as fast as possible. The following techniques are available for processing: The solvent is distilled off under the addition of heat and/or reduced pressure, and the product is dried, for example, in a heating cabinet, or the precipitated product is separated from the solvent by filtering, suctioning off via a frit or the like and then likewise dried. A heating cabinet can be used for drying; but other drying methods, such as spray drying, are also suitable. The thus obtained powders may, as required, be ground up for separating more highly agglomerated structures in an agitator, e.g., a ball mill, in the presence of a dispersing agent or as such further, possibly up to the primary particle structure.

The nanoparticles thus obtained are x-ray amorphous and have very large specific surface areas and pore volumes. It turned out that with comparable starting materials, i.e., those which yield products with equal organic modification, the particles produced from silazanes have a larger specific surface area and a larger pore volume than those which were produced from silanes/oligomeric siloxanes. Therefore, the use of silazanes as starting material is preferred for the production of particles with especially large specific surface area and/or especially large pore volume.

Because of the large specific surface areas and pore volumes of the particles as well as their large pore diameters, they (and including in turn especially those produced from silazanes) are well suited for incorporating into polymers. Besides a good filler action regarding the mechanical and thermal properties, it surprisingly turned out that the particles, as a result of their specific surface structures when incorporated into prepolymer resins, from which duromers shall be produced by aftercuring, are capable of accelerating the polymerization of prepolymers. Incorporation into other polymers such as thermoplastics is also possible. A high separating action of the particles is also assumed if they shall be used for chromatography applications.

To fill polymers, the polysiloxane nanoparticles according to the present invention are incorporated into the corresponding liquid or viscous prepolymer resins, for example, in portions up to 20 wt. %, preferably of 1 wt. % to 10 wt. %, in powder form or as a highly as possible concentrated dispersion in a suitable solvent. An agitator may be used to support the incorporation. Stirring in takes place at suitable temperatures; for example, preferably temperatures which are slightly elevated compared to room temperature are selected for cyanate resins because these resins are then less highly viscous, but still do not crosslink. Surprisingly, at least visually agglomerate-free dispersions can usually be obtained by mere stirring; the incorporation is possibly supported by homogenization (e.g., at 3,000-5,000 rpm). Such dispersions remain stable (i.e., with low viscosity) at room temperature or below it for several weeks.

Incorporation of the polysiloxane nanoparticles according to the present invention in cyanate resins is especially preferred. The selection of the mono- and especially multifunctional cyanates that can be used as starting materials for this is not critical. In principle, any at least bifunctional cyanate body can be used, including, above all, aromatic cyanates and among these in turn especially di- or polyfunctional cyanates of the structures I-IV mentioned below:

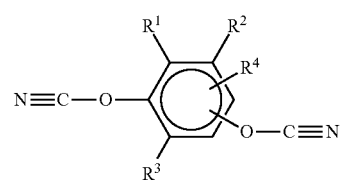

I in which $R^1$ through $R^4$, independently of one another, are hydrogen, $C_1$-$C_{10}$ alkyl, $C_3$-$C_8$ cycloalkyl, $C_1$-$C_{10}$ alkoxy, halogen (F, Cl, Br or I), phenyl or phenoxy, wherein the alkyl or aryl groups may be fluorinated or partially fluorinated; examples are phenylene-1,3-dicyanate, phenylene-1,4-dicyanate, 2,4,5-trifluorophenylene-1,3-dicyanate;

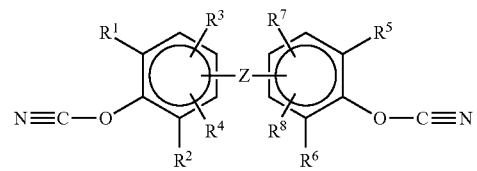

II in which $R^5$ through $R^8$ are like $R^1$ through $R^4$ and Z is a chemical bond, $SO_2$, $CF_2$, $CH_2$, CHF, $CH(CH_3)$, isopropylene, hexafluoroisopropylene, $C_1$-$C_{10}$ alkylene, O, $NR^9$, N=N, CH=CH, COO, CH=N, CH=N—N=CH, alkyleneoxyalkylene with $C_1$-$C_8$ alkylene, S, $Si(CH_3)_2$ or

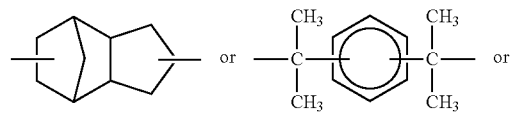

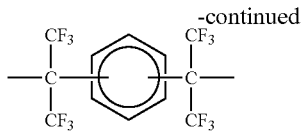

Examples are 2,2-bis(4-cyanato-phenyl)propane, 2,2-bis (4-cyanato-phenyl)hexafluoropropane, and biphenylene-4,4'-dicyanate;

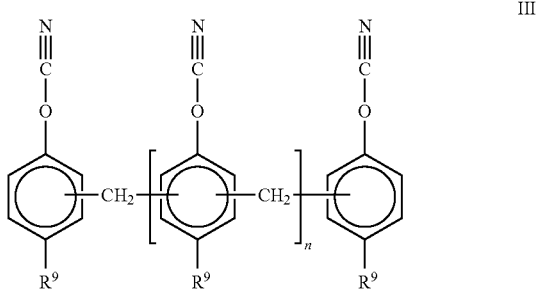

in which $R^9$ is hydrogen or $C_1$-$C_{10}$ alkyl and n is an integer of 0 to 20, as well as
di- or multifunctional aliphatic cyanates with at least one fluorine atom in the aliphatic radical and preferably of structure IV:

$$N\equiv C-O-R^{10}-O-C\equiv N \qquad IV$$

in which $R^{10}$ is a divalent organic nonaromatic hydrocarbon with at least one fluorine atom and especially with 3 to 12 carbon atoms, whose hydrogen atoms can be entirely or partially replaced with other fluorine atoms, The said cyanates may be used as monomers or as (even further crosslinkable) prepolymers of the said compounds, alone or in mixtures with one another or mixed with other, e.g., monofunctional cyanates and/or with phenols, bisphenols, glycidyl derivatives and the like.

Concrete examples of usable di- or oligocyanates are as follows: Dicyanate of bisphenol A (4,4'-dimethylmethylene-diphenyldicyanate; B10), 4,4'-methylmethylene-diphenyldicyanate (L10), 4,4'-methylidene diphenyldicyanate (M10), compounds with formula VI, in which n is 1, 2, 3, 4, 5 or 6, $R^9$ is hydrogen and the methylene group is in ortho position to each cyanate group (PT15/PT30).

If the cyanate resin dispersions are heated to crosslinking temperatures, a marked acceleration of the polyreaction progress compared with unfilled prepolymer resins is observed. Since the polysiloxane nanoparticles do not contain reactive groups, it is assumed that catalytically active physisorption processes at the phase boundary between polysiloxane nanoparticles and an additional penetration of the monomers/prepolymers into the particle nucleus play a decisive role for the acceleration of the polyreaction (polymerization), even though the mechanisms behind this phenomenon are still not clarified.

The products thus obtained show depending on the filler a significant increase in the glass transition temperature $T_g$. Thus, filled cyanate duromers could be obtained with a glass transition temperature that was up to 35K over those of the same duromers without filler. The burning behavior of filled duromers shows filler-dependent specs, which may be advantageous for some applications. Their water uptake is markedly reduced because of the hydrophobicity of the nanoparticles depending on their content.

Those particles that were obtained in an alkaline medium and are therefore meltable can, instead, be used for producing moldings with varying highly hydrophobic surface areas. For this purpose, they are brought to the suitable temperature (e.g., in the range of 60-100° C.), melted and then placed into a desired die or applied as a layer. When cooling off, they solidify into the corresponding moldings, which can then be removed from the die, or form surfaces which can be microstructured in a tailor-made manner. For this, the melted polysiloxane can be poured into master dies, whose surface is microstructured in a tailor-made manner. After solidifying at, e.g., room temperature, the master die is removed, the polysiloxane molding now has assumed the microstructure of the master die on its surface. The master die may, for example, have a surface structure that simulates the "lotus effect."

As an alternative, meltable particles may also be used for the production of smooth or structured surfaces, e.g., by means of "dip coating" or by spraying on with a possibly heated spray gun.

The present invention shall be explained in detail below on the basis of examples.

EXAMPLE 1

One hundred g of a polysilazane with approx. 33 mol. % of units of the composition —[Si(CH$_3$)$_2$—NH]— and approx. 67 mol. % of units of the composition —[Si(H)(CH$_3$)—NH]— are charged into a 2-L three-necked flask equipped with a KPG stirrer, a reflux cooler, a dropping funnel and a heating bath in 1 L of isopropyl alcohol and heated to reflux while stirring. Then, a first portion of 2.0 g of 85% potassium hydroxide in 200 mL of distilled water is added dropwise and, if necessary, while cooling. Ammonia and hydrogen form. As soon as the mixture is no longer boiling strongly during the dropwise addition, the rate of the addition is increased as much as possible. After subsequent stirring under reflux for several hours, the mixture is cooled off to room temperature. The product is suctioned off via a G4 frit, and the remaining product is dried in the heating cabinet for 12 hr. at 80° C. The powder obtained is x-ray amorphous and it has a specific surface area $A_o$ of 225 m$^2$/g, a pore volume of 0.746 cm$^3$/g and an average pore diameter $d_{50}$ of 1.34 nm according to BET measurements. It has a bulk volume of 8.0 cm$^3$/g. The $^{29}$Si CP MAS NMR spectrum shows that, as expected, the predominant part of the Si atoms is located in a CH$_3$Si(O—)$_3$ environment (T$^3$ structure), and a smaller part is located in a (CH$_3$)$_2$Si(O—)$_2$ environment (D$^2$ structure) (shifts at −67.4 and −22.0 ppm). Moreover, hints of small quantities of T$^1$ structures (CH$_3$Si(O—)(OCH$_3$)$_2$) are found. Contact angle measurements between water and the powder proved to be relatively difficult, since the surface of the nanoparticles is not flat. However, the measurements make it possible to assess the contact angle as lying between 120° and 125°.

EXAMPLE 2

Example 1 is repeated with the change that 100 g of a polysilazane with approx. 20 mol. % of units —[Si(H)(CH$_3$)—NH]— and approx. 80 mol. % of —[Si(H)(CH$_3$)—NH]— units are used. Again, ammonia and hydrogen form. After stirring under reflux for several hours, the mixture is cooled off to room temperature. The precipitated product is separated from the main part of the solvent via a suction filter and subjected to spray drying at 95° C. The powder obtained is x-ray amorphous and has a specific surface area $A_o$ of 383 m$^2$/g, a pore volume of 1.375 cm$^3$/g and an average pore diameter $d_{50}$ of 1.49 nm according to BET measurements. Its bulk volume was determined to be 5.9 cm³/g. The FT-IR spectra of the product (FIG. 1a) and of the starting silazane (FIG. 1b) are arranged in FIG. 1 for comparison with one another: One recognizes a quantitative conversion of Si—N and Si—NH groups with the formation of Si—O—Si bonds. The $^{29}$Si CP MAS NMR spectrum shows that the degree of condensation in the particles is slightly higher than in the particles of Example 1. The $T^3$ resonance appears here at −67.1 ppm, the $D^2$ resonance is subject to a shift of approx. −22 ppm to approx. −35 ppm because of the spin-orbit couplings between the n-orbitals of the vinyl group and the d-orbitals of the silicon. As in Example 1, hints of a very small portion of $T^1$ structures are also found. Contact angle measurements yielded the same result as for Example 1.

EXAMPLE 3

Figure 2:
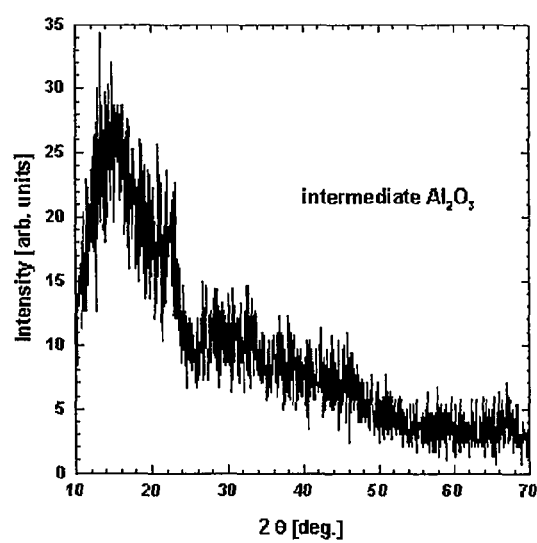
FIG. 2 shows the x-ray diffractogram of the particles in Example 3.

Example 1 is repeated, wherein a mixture of 33 mol. % of dimethyldiethoxysilane and 67 mol. % of methyltrimethoxysilane is used instead of the polysilazane, however. After adding the base as in Example 1, the mixture is stirred for several hours and then cooled off. The solvent is extensively distilled off in the rotary evaporator at 60° C. under reduced pressure (approx. 200 mbar), and the remaining product is dried in the heating cabinet for 12 hr. at 80° C. The x-ray diffractogram of the particles is shown in FIG. 2; accordingly, they prove to be x-ray amorphous. According to BET measurements, the powder obtained has a specific surface area $A_o$ of 59 m²/g, a pore volume of 0.211 cm³/g and an average pore diameter $d_{50}$ of 1.39 nm. The $^{29}$Si CP MAS NMR spectrum shows that, as expected, the predominant part of the Si atoms is located in a $CH_3Si(O—)_2$ environment ($D^2$ structure) (shifts at −67.3 and −21.8 ppm). Moreover, a shoulder at −19.9 ppm, which is less highly pronounced in the product of Example 1, points to the presence of small portions of units, in which the silicon contains, besides two methyl radicals and an O—Si bridge, a free hydroxyl radical, as well as a weakly pronounced peak at −57.5 ppm [points] to the presence of other small portions of units, in which such a hydroxyl group is bonded to silicon atoms, which have, moreover, a methyl radical and two O—Si bridges ($D^1$ and $T^2$ structures). A $T^2$ structure is not found in the particles of Example 1. Contact angle measurements yielded the same result as for Example 1.

EXAMPLE 4

Figure 1B:
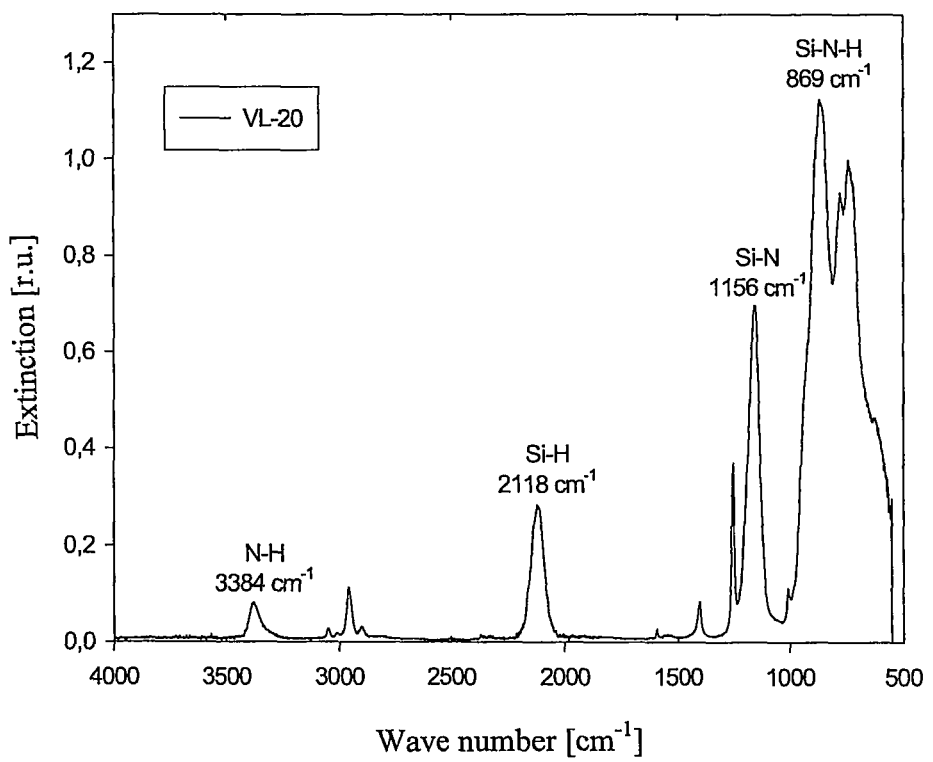
FIG. 1b shows the FT-IR spectra of the starting silazane in Example 2.
Figure 1C:
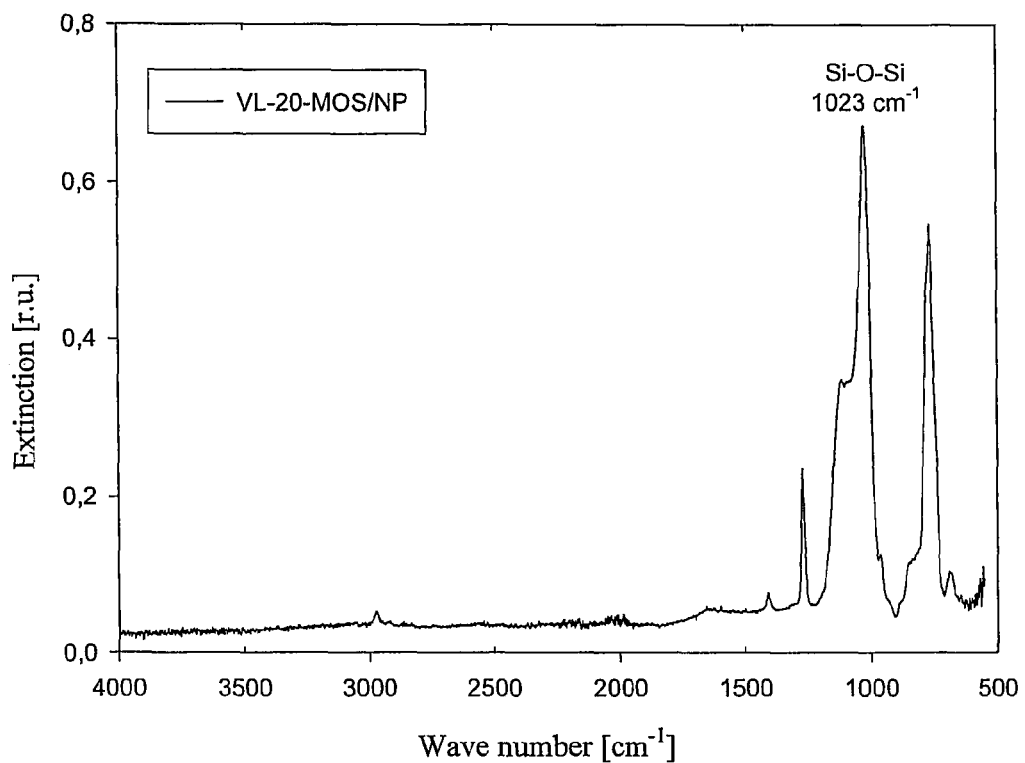
FIG. 1c shows the FT-IR spectra of the product in Example 4.

Example 2 is repeated, whereby, however, a mixture of 20 mol. % of vinylmethyldimethoxysilane and 80 mol. % of methyltrimethoxysilane is used instead of the polysilazane. The processing takes place as in Example 3. The powder obtained is x-ray amorphous and has a specific surface area $A_o$ of 222 m²/g, a pore volume of 0.349 cm³/g and an average pore diameter $d_{50}$ of 0.81 nm according to BET measurements. FIG. 1 shows the FT-IR spectrum of the product (FIG. 1c); it is almost identical to that from Example 1 (FIG. 1a). The $^{29}$Si CP MAS NMR spectrum differs from that of Example 2 especially in that $T^1$ structures are not detectable; on the other hand, very small amounts of $T^2$ structures at −56.6 ppm are recognizable. Contact angle measurements yielded the same result as for Example 1.

All nanopowders of Examples 1 through 4 show a pronounced tendency toward agglomeration and a mean particle size of approx. 100 nm as determined by means of scanning electron microscope analyses. A comparison of the recordings with those of commercially available AEROSIL OX50 particles revealed a comparable size, although these have a diameter of 40 nm according to the data provided by the manufacturer.

EXAMPLE 5

Example 3 is repeated, whereby, however, a mixture of 33 mol. % of n-octyltrimethoxysilane and 67 mol. % of tetramethoxysilane is used as the silane mixture. The processing takes place as in Example 2. A powder is obtained. Contact angles in the range of 130-135° were measured.

EXAMPLE 6

Example 1 is repeated with the change that the particles were not isolated from the mixture after the cooling off, but rather the dispersion obtained was ground for 3 hr. in a SL-12C agitated ball mill (grinding chamber volume 125 mL, $ZrO_2$ grinding medium with a diameter of 1.2-1.7 mm, a bulk volume of 100 m [sic-Tr.], at a grinding rotor speed of 5,500 rpm). Subsequently, the solvent was removed by distilling off. The bulk volume of the particles obtained was, at 5.0 cm³/g, markedly lower than that of the particles according to Example 1.

EXAMPLE 7

Example 2 is repeated with the change that the particles were not isolated from the mixture after the cooling off, but rather the dispersion obtained was ground for 6 hr. in a SL-12C agitated ball mill (grinding chamber volume 125 mL, $ZrO_2$ grinding medium with a diameter of 1.2-1.7 mm, a bulk volume of 100 m [sic-Tr.], at a grinding rotor speed of 5,500 rpm). Subsequently, the solvent was removed by distilling off. The bulk volume of the particles obtained was, at 4.0 cm³/g, markedly lower than that of the particles according to Example 2.

COMPARISON EXAMPLE 1

Example 1 is repeated with the change that 100 g of a polysilazane with approx. 85 mol. % of units of the composition —[Si(CH$_3$)$_2$—NH]— and approx. 15 mol. % of units of composition —[Si(H)(CH$_3$)—NH]— are used. A silicon rubber is formed in the solvent.

COMPARISON EXAMPLE 2

Example 1 is repeated with the change that 100 g of a polysilazane with approx. 100 mol. % of units of —[Si(phenyl)(CH$_3$)—NH]— are used. A viscous syrup is formed in the solvent.

COMPARISON EXAMPLE 3

Example 1 is repeated with the change that 100 g of a polysilazane with approx. 50 mol. % of units of —[Si(CH$_3$)$_2$—N(CH$_3$)— are used. A lower liquid phase with higher viscosity and an upper liquid phase with lower viscosity are formed.

COMPARISON EXAMPLE 4

Example 1 is repeated with the change that 100 g of a polysilazane with approx. 50 mol. % of units of the composition —[Si(C$_2$H$_3$)(CH$_3$)—NH]— and approx. 50 mol. % of units of the composition —[Si(CH$_3$)$_2$—NH]— are used. A gelatinous mass is formed in the solvent.

COMPARISON EXAMPLE 5

Example 1 is repeated with the change that 100 g of an ethoxysilylated silazane with approx. 45 mol. % of units —[Si(H)(CH$_3$)—NH]—, approx. 0.22 mol. % of units —[Si(CH$_3$)$_2$—NH]— and approx. 33 mol. % of units —[Si(CH$_3$)$_2$—N(SiR$_3$)]— with R equal to ethoxy are used. A precipitate forms, which remains as a friable mass after drying.

EXAMPLES 8 THROUGH 14

Polysiloxane nanoparticles are incorporated with portions of 5 wt. % and 10 wt. %, respectively, into the cyanate resin L-10, as follows:
5 wt. % particles of Example 1=Example 8
5 wt. % particles of Example 2=Example 9
5 wt. % particles of Example 3=Example 10
10 wt. % particles of Example 1=Example 11
10 wt. % particles of Example 2=Example 12
18.2 wt. % particles of Example 6=Example 13
13.9 wt. % particles of Example 7=Example 14
(stirring in for 10 min. at 500 rpm, 60° C.; homogenization for 3 hr. at 4,000 rpm, 70° C.). Here, liquid dispersions are obtained; experiments with 10 wt. % portions of particles which were produced from siloxanes yielded, by contrast, rather viscous pastes. It was shown that mere stirring is sufficient to obtain at least visually agglomerate-free mixtures. Moreover, the polysiloxane/L-10 dispersions remain liquid at room temperature over several weeks, while the unmodified cyanate resin solidifies after a residence time of several days. It turned out that a markedly higher particle content could be incorporated into the resin (see Examples 13 and 14) with the particles of Examples 6 and 7, i.e., with the particles subsequently ground into the dispersion, while the particles of Examples 1 and 2 could be incorporated only up to approx. 11.5 wt. %. Above this filler content, the viscosity in these cases increased drastically, such that the nanodispersions were no longer flowable.

EXAMPLES 15 THROUGH 21

The filled resins of Examples 8 through 14 were cured by heating. In thin-layer chromatography analyses (heating rate 10 K/min.), all dispersions showed marked acceleration of the polymerization progress compared with the unmodified resin L-10: For example, in case of the resins according to Examples 9 and 12 (Examples 16 and 19), the temperature maximum of the polymerization enthalpy of 293° C. (pure L-10) is shifted to 268° C. (5 wt. % filler, Example 16) to 263° C. (10 wt. % particle content, Example 19).

Consequently, compared with the unmodified resin, the curing procedure was markedly modified to the extent that (1) the curing was performed in an overall shorter period of time and (2) initially at temperatures by approx. 50K lower, even though, for complete curing as in the unfilled resin, it is necessary to anneal up to a maximum temperature of approx. 250° C.

Figure 3:
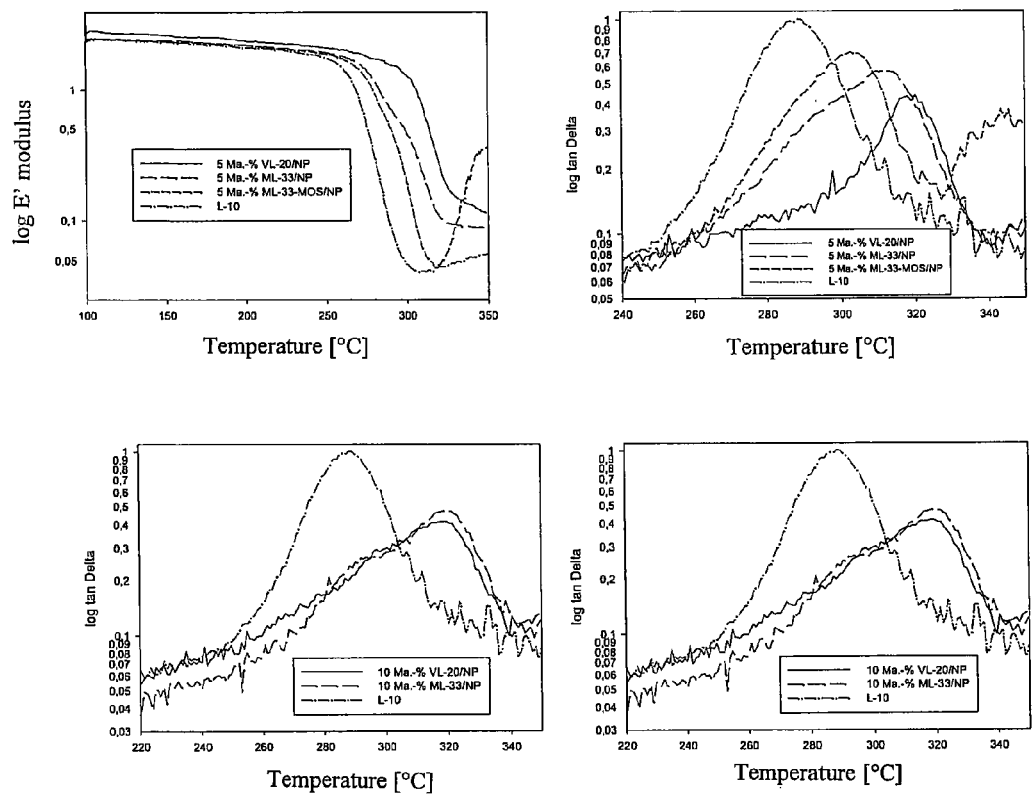
FIG. 3 shows the temperature dependence of the memory module G' (image on the left in each case) and of tan delta of the composites filled with polysiloxane particles compared with the unmodified polymer (heating rate 5 K/min.) in Examples 15 through 21.

Surprisingly, the composites in DMA [dynamic mechanical analysis] analyses (vibration frequency 1 Hz, heating rate 5 K/min., temperature range of 100° C. to 350° C.) show a filler-dependent significant increase in the glass transition temperature T$_g$ (maximum of tan delta) by up to 35K compared with the unmodified polymer. FIG. 3 shows the temperature dependence of the memory module G' (image on the left in each case) and of tan delta of the composites filled with polysiloxane particles compared with the unmodified polymer (heating rate 5 K/min.).

Analyses on the burning behavior were conducted on two nanocomposites using a cone calorimeter at 50 kW/m$^2$. The results are shown in the table below:

| Example | TTI [sec] | HRRpeak [kW/m$^2$] | MARHE [kW/m$^2$] | THR [MJ/m$^2$] | TSR [m$^2$/m$^2$] | Δm [%] |
|---|---|---|---|---|---|---|
| 15 | 81 | 142 | 65 | 62 | 1,438 | 52 |
| 16 | 79 | 162 | 65 | 66 | 1,612 | 54 |
| L-10 | 124 | 141 | 70 | 123 | 2,422 | 89 |

For measuring water uptake, the cyanate polymers were stored for 48 hr. at 70° C. in water. Besides the polymers of Examples 15 through 21, polymers, which were filled with 5 wt. % of particles of Examples 6 (Example 22) and 7 (Example 23) as well as with 10 wt. % of particles of Examples 6 (Example 24) and 7 (Example 25), were also analyzed for this. After air drying at room temperature the weight gain was determined as is evident from the following table:

| Example | Starting weight [g] | Final weight [g] | Weight gain [%] | Water content [%] | Reduction in water uptake vs. L-10 [%] |
|---|---|---|---|---|---|
| 15 | 1.257 | 1.277 | 1.59 | 1.57 | 34.3 |
| 16 | 0.981 | 0.996 | 1.53 | 1.51 | 36.8 |
| 17 | 0.732 | 0.744 | 1.64 | 1.61 | 32.6 |
| 18 | 0.618 | 0.625 | 1.13 | 1.12 | 53.1 |
| 19 | 0.618 | 0.624 | 0.97 | 0.96 | 59.8 |
| 20 | 0.866 | 0.866 | 0 | 0 | 100 |
| 21 | 0.541 | 0.541 | 0 | 0 | 100 |
| 22 | 0.850 | 0.858 | 0.94 | 0.93 | 61.1 |
| 23 | 1.301 | 1.317 | 1.31 | 1.21 | 49.4 |
| 24 | 0.745 | 0.750 | 0.67 | 0.66 | 72.4 |
| 25 | 0.856 | 0.862 | 0.70 | 0.70 | 70.7 |
| L-10 | 0.938 | 0.961 | 2.45 | 2.39 | —.— |

Because of the hydrophobicity of the nanoparticles, the water uptake is reduced by up to 100% and shows the expected dependence on the filler portion in the cyanate polymer.

The measurement of the fracture toughness yielded the following values:

| Example | Mean K$_{1C}$ value, [mN/m$^{3/2}$] |
|---|---|
| 16 | 0.61 |
| 15 | 0.66 |
| 17 | 0.64 |
| 19 | 0.62 |
| 18 | 0.60 |
| L-10 | 0.64 |

Figure 4:

EXAMPLE 26a 20.0 g of n-octadecyltrimethoxysilane in 200 mL of isopropyl alcohol are charged into a 500-mL three-necked flask provided with a magnetic stirrer, a reflux cooler, a dropping funnel and a heating bath and heated to reflux while stirring. Then, a solution of 0.4 g of potassium hydroxide (with 85 wt. %) in 40 mL of distilled water is added all at once. After subsequently stirring under reflux for 5 hr., the mixture is cooled off to room temperature, the precipitate is suctioned off via a G4 frit, washed free from alkali with methyl alcohol and the powder obtained is dried overnight at 50° C. in the heating cabinet. The yield of n-octadecylpolysiloxane nanoparticles with a contact angle ($H_2O$) of 140° to 145° is almost quantitative. FIG. 4 shows a drop of water on a surface made of these nanoparticles.

EXAMPLE 26b

Example 26 is repeated provided that the n-octadecyltrimethoxysilane in isopropyl alcohol remains at room temperature and the mixture is stirred for 10 hr. after adding the KOH solution. An identical contact angle is measured.

EXAMPLE 26c 20.0 g of n-octadecyltrimethoxysilane in 200 mL of isopropyl alcohol are charged into a 500-mL three-necked flask provided with a magnetic stirrer, a reflux cooler, a dropping funnel and a heating bath. Then, 10 mL of 37% hydrochloric acid are added all at once while stirring. After subsequently stirring at room temperature for 10 hr., the precipitate is suctioned off via a G4 frit, then rewashed with isopropyl alcohol, and the powder obtained is dried overnight at 50° C. in the heating cabinet. The yield of n-octadecylpolysiloxane [sic, typo in original-Tr.Ed.] nanoparticles with a contact angle ($H_2O$) of 140° to 145° is almost quantitative. These cannot melt even at 150° C.; they are, however, sinterable.

EXAMPLE 27a

Example 26a is repeated provided that 17.65 g of n-octadecyltrimethoxysilane and 2.35 g of methyltrimethoxysilane are charged in instead of 20.0 g of n-octadecyltrimethoxysilane. The yield of n-octadecyl-co-methyl-polysiloxane nanoparticles is almost quantitative.

EXAMPLE 27b

Example 27a is repeated provided that 16.67 g of n-octadecyltrimethoxysilane and 3.33 g of methyltrimethoxysilane are charged in. The yield of n-octadecyl-co-methyl-polysiloxane nanoparticles is almost quantitative.

EXAMPLE 27c

Example 27a is repeated provided that 15.0 g of n-octadecyltrimethoxysilane and 5.0 g of methyltrimethoxysilane are charged in. The yield of n-octadecyl-co-methyl-polysiloxane nanoparticles is almost quantitative.

EXAMPLE 28

Example 26a is repeated provided that 16.0 g of n-octadecyltrimethoxysilane and 40.0 g of tetramethoxysilane are charged in instead of 20.0 g of n-octadecyltrimethoxysilane. The powder obtained is dried overnight at 40° C. in the heating cabinet. The yield of n-octadecyl-co-$SiO_2$-polysiloxane nanoparticles is almost quantitative.

EXAMPLE 29

A mixture of 20 mL of methyl alcohol and toluene each as well as 1.0 g of pyridine is charged into a 50-mL Erlenmeyer flask equipped with a magnetic stirrer, a reflux cooler, a dropping funnel and a heating bath. Then, 0.75 g of n-triacontyltrichlorosilane are added all at once and then the mixture is heated to reflux while stirring. After homogenization is performed, a solution of 0.35 g of 85 wt. % potassium hydroxide in 8 mL of distilled water is added all at once. After subsequent stirring under reflux for 5 hr., the mixture is cooled off to room temperature, the precipitate is suctioned off via a G4 frit, washed free from alkali and pyridine with water/methyl alcohol (V/V=1:1), and the powder obtained is dried overnight at 40° C. in the heating cabinet. The yield of n-triacontyl-(C-30)-polysiloxane nanoparticles is almost quantitative.

EXAMPLE 30

A mixture of 20 mL of methyl alcohol and 1.0 g of pyridine is charged into a'50-mL Erlenmeyer flask. Then, 0.727 g of 1H,1H,2H,2H-perfluoro-n-decyltrichlorosilane are added dropwise. After letting stand for 2 hr. at room temperature, the homogeneous mixture is ready to use for the following conversions:

EXAMPLE 31

3.28 g of n-octadecyltrimethoxysilane and the mixture obtained according to Example 27 in 40 mL of isopropyl alcohol are charged into a 250-mL three-necked flask equipped with a magnetic stirrer, a reflux cooler, a dropping funnel and a heating bath and heated to reflux while stirring. A solution of 0.35 g of potassium hydroxide (with 85 wt. %) in 8 mL of distilled water is then added all at once. After subsequent stirring under reflux for 5 hr., the mixture is cooled off to room temperature, the precipitate is suctioned off via a G4 fit, washed free from alkali and pyridine with water/methyl alcohol (V/V=1:1) and the powder obtained is dried overnight at 50° C. in the heating cabinet. The yield of chemically intrinsic n-octadecyl/perfluoro-n-decylpolysiloxane nanoparticles with a C:Si ratio of 17:1 and a contact angle ($H_2O$) of 135° to 140° is almost quantitative. After further intensive washing of the particles with $H_2O/CH_3OH$ for the purpose of complete removal of pyridine hydrochloride and KOH ($K_2CO_3$), a contact angle of 134-139° is measured.

EXAMPLE 32

3.28 g of n-octadecyltrimethoxysilane in 40 mL of isopropyl alcohol are charged into a 250-mL three-necked flask equipped with a magnetic stirrer, a reflux cooler, a dropping funnel and a heating bath and heated to reflux while stirring. A solution of 0.35 g of potassium hydroxide (with 85 wt. %) in 8 mL of distilled water is then added all at once. After subsequent stirring under reflux for 5 hr., the mixture obtained according to Example 27 is added within 5 min. and boiled under reflux for another 2 hr. Then, the mixture is cooled off to room temperature, the precipitate is suctioned off via a G4 frit, washed free from alkali and pyridine with water/methyl alcohol (V/V=1:1), and the powder obtained is dried overnight at 50° C. in the drying cabinet. The yield of n-octadecyltrimethoxysilane nanoparticles coated with perfluoro-n-decylpolysiloxane and thus chemically non-intrinsic n-octadecyl/perfluoro-n-decylpolysiloxane nanoparticles with a C:Si ratio of 17:1 and a contact angle ($H_2O$) of 125° to 130° is almost quantitative. After further intensive washing of the particles with $H_2O/CH_3OH$ for the purpose of complete removal of pyridine hydrochloride and KOH ($K_2CO_3$), a contact angle of 134-139° is measured.

EXAMPLE 33

5.0 g of 1H,1H,2H,2H-perfluoro-n-decyl-trichlorosilane in 40 mL of symmetrical triethylbenzene are charged into a 250-mL three-necked flask equipped with a magnetic stirrer and gas distribution. A strong air current is then passed through the flask at room temperature while continuously stirring for 24 hr. A washing bottle containing 250 mL of distilled water, which is arranged upstream of the flask, saturates the air permanently with water vapor. Then, the precipitate is suctioned off via a G4 rewashed with acetone, [sic-and] the powder obtained is dried overnight at 50° C. in the drying cabinet. The yield of 1H,1H,2H,2H-perfluoro-n-decylpolysiloxane nanoparticles with a contact angle ($H_2O$) of 145° to 152° is almost quantitative.

EXAMPLE 34

5.0 g of n-octadecyltrichlorosilane in 40 mL of symmetrical triethylbenzene are charged into a 250-mL three-necked flask equipped with a magnetic stirrer and gas distribution. A strong air current is then passed through the flask at room temperature while continuously stirring for 12 hr. A washing bottle containing 250 mL of distilled water, which is arranged upstream of the flask, saturates the air permanently with water vapor. Then, the precipitate is suctioned off via a G4 frit, rewashed with acetone, [sic-and] the powder obtained is dried overnight at 50° C. in the drying cabinet. The yield of n-octadecylpolysiloxane nanoparticles with a contact angle ($H_2O$) of 140° to 145° is almost quantitative.

The polysiloxane nanoparticles obtained by alkaline catalysis of Examples 26a, 26b, 28 and 29 (fp. between 50° C. and 60° C.) were melted at 85° C. and applied to glass slides. After cooling, the contact angles to water on the smooth surfaces were only 90-115° C. They can be increased sharply by means of suitable microstructuring of the surfaces.

The polysiloxane nanoparticles obtained by acidic autocatalysis of Examples 30 and 31 cannot melt even at 150° C.; however, they are sinterable.

In summary, the present invention especially pertains to the following:

a. Polysiloxane nanoparticles with the following properties:
    an average particle size $d_{50}$ (measured using REM recordings) in the range of 10 nm to 200 nm,
    a specific surface area $A_o$ of at least 50 m$^2$/g,
    a pore volume of at least 0.2 cm$^3$/g, and
    an average pore diameter $d_{50}$ of at least 0.8 nm,
    wherein the particles have carbon-containing groups, which are at least partially bonded to the silicon in the form of unsubstituted or substituted alkyl, alkenyl, aryl, arylalkyl or alkylaryl groups.
b. Polysiloxane nanoparticles according to point a, wherein these particles have a contact angle to water of at least approx. 100°, more preferably of at least 110°, even more preferably of at least 120° and especially preferably of at least 135°.
c. Polysiloxane nanoparticles according to point a or b, wherein these particles have an average particle size of 70 nm to 130 nm.
d. Polysiloxane nanoparticles in accordance with one of the above points, wherein the particles have a specific surface area $A_o$ of at least 100 m$^2$/g, and preferably of at least 200 m$^2$/g.
e. Polysiloxane nanoparticles in accordance with one of the above points, which are present as agglomerates with a diameter of up to 500 μm, and preferably of up to 200 μm.
f. Polysiloxane nanoparticles in accordance with one of the above points with a pore volume of at least 0.5 cm$^3$/g, and preferably of at least 0.7 cm$^3$/g.
g. Polysiloxane nanoparticles in accordance with one of the above points with an average pore diameter ($d_{50}$) of at least 1.0 nm and preferably of at least 1.25 nm.
h. Polysiloxane nanoparticles in accordance with one of the above points, wherein more than one carbon atom directly bonded to no more than 60%, and preferably to no more than 40% of the silicon atoms is present.
i. [sic, missing, sequence out of order in original-Tr.]
j. Polysiloxane nanoparticles in accordance with one of the above points with a portion of, on average, a maximum of 3.5 carbon atoms per silicon atom and/or wherein more than one carbon atom directly bonded to no more than 80% of the silicon atoms is present.
k. Polysiloxane nanoparticles in accordance with one of the points a through h with a portion of, on average, a maximum of 18 carbon atoms, more preferably an average of 12 carbon atoms and especially preferably of, on average, a maximum of 8 carbon atoms per silicon atom.
l. Polysiloxane nanoparticles in accordance with one of the above points, wherein the alkyl, alkenyl, aryl, arylalkyl and/or alkylaryl groups are partially or entirely fluorinated.
m. Polysiloxane nanoparticles in accordance with one of the above points, which are meltable or sinterable.
A. Method for producing polysiloxane nanoparticles in accordance with one of the points a through m, wherein
    (i) a silazane or a mixture of different silazanes with one or more —[Si(R)(R$^1$)—NR$^2$]— units, in which R and R$^1$ may be the same or different in each individual unit and in various units, if various units are present, and they denote an unsubstituted or substituted alkyl, alkenyl, aryl, arylalkyl, alkylaryl or hydrogen and R$^2$ is hydrogen or alkyl provided that the silazane or silazanes used have a portion, on average, of a maximum of 3.5 carbon atoms per silicon atom overall, wherein more than one carbon atom bonded to no more than 80% of the silicon atoms may be present, and/or
    (ii) a silane or mixture of different silanes with the formula R'$_a$SiX$_{4-a}$, in which R' may be the same or different and is an unsubstituted or substituted alkyl, alkenyl, aryl, arylalkyl or alkylaryl, X is a group hydrolytically condensable from the silicon under hydrolysis conditions while forming an Si—O—Si group or is OH, and a is 0, 1 or 2, or an oligosiloxane or a mixture of such oligosiloxanes obtainable by hydrolytic condensation of this silane/these silanes
    is/are charged into a solvent and brought into contact with a highly alkaline medium in such a way that the pH is not below 13 after the addition thereof.
B. Method in accordance with point A, variant (ii), wherein the silane or silanes used has/have a portion, on average, of a maximum of 3.5 carbon atoms per silicon atom overall, wherein more than one carbon atom bonded to no more than 80% of the silicon atoms may be present.
C. Method in accordance with point A or B, wherein the highly alkaline medium is selected from among aqueous potassium hydroxide and sodium hydroxide and the pH is at least 13.0 after the addition.
D. Method in accordance with one of the points A through C, characterized in that the radicals R and R$^1$ are selected from among C$_1$-C$_7$ alkyl and C$_3$-C$_7$ alkylene and especially from among methyl, ethyl and vinyl.
E. Method in accordance with one of the points A through C, wherein the radicals R' are selected from among C$_1$-C$_{12}$ alkyl and C$_3$-C$_{12}$ alkylene and aryl, and especially from among methyl, ethyl, i- and n-propyl, n-octyl, vinyl and phenyl.

F. Method in accordance with one of the points A through E, wherein the silazane is selected from among cyclic and open-chain silazanes of the formula (V)

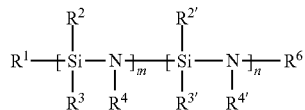
(V)

in which
(i) $R^2$ and $R^3$ are the same or different and denote hydrogen or straight-chain, branched or cyclic, substituted or unsubstituted alkyl, alkenyl, aryl, arylalkyl or alkylaryl, wherein each of the substituents $R^2$ and $R^3$ may have a different meaning if m is greater than 1 in various units or has the same meaning,
and $R^{2'}$ and $R^{3'}$ are the same or different and denote straight-chain, branched or cyclic, substituted or unsubstituted alkyl, alkenyl, aryl, arylalkyl, alkylaryl, alkenylaryl or arylalkenyl, in which each of the substituents $R^{2'}$ and $R^{3'}$ may have a different meaning if n is greater than 1 in various units, but preferably has the same meaning, or
(ii) $R^2$ and $R^{2'}$ have the meaning indicated above and (in the presence of at least one radical $R^3$ and of at least one radical $R^{3'}$) all or some of the radicals $R^3$ and $R^{3'}$ may together represent an unsubstituted or substituted, straight-chain or branched alkylene group with preferably two bridging carbon atoms, wherein possibly the remaining part of the radicals $R^3$ and $R^{3'}$ has the meaning indicated under (a),
and in which
$R^4$ and $R^{4'}$ denote hydrogen or alkyl,
$R^1$ and $R^6$ are the same or different and may have the same meaning as $R^2$ and $R^3$, wherein
$R^6$ may, moreover, also denote $Si(R^1)(R^{2'})(R^{3'})$, or $R^1$ and $R^6$ together represent a single bond,
m is 1, 2, 3, 4, 5, 6, 7, 8, 9, 10 or an integer between 11 and 25,000, and preferably between 11 and 200, and
n is 0, 1, 2, 3, 4, 5, 6, 7, 8, 9, 10 or an integer between 11 and 25,000, and preferably between 11 and 200.

G. Method for producing polysiloxane nanoparticles in accordance with one of the points a through m, wherein
(i) a silane or a mixture of different silanes with the formula $R'_a SiX_{4-a}$, in which R' may be the same or different and is an unsubstituted or substituted alkyl, alkenyl, aryl, arylalkyl or alkylaryl, X is a halogen and preferably Cl, and a is 0, 1 or 2, or an oligosiloxane or a mixture of such oligosiloxanes obtainable by hydrolytic condensation of this silane/these silanes is/are charged into any solvent with the exception of water exclusively, whereupon a moist air current is directed through the solution/suspension, after which the product is separated from the solvent and possibly dried, or
(ii) a silane or a mixture of different silanes with the formula $R'_a SiX_{4-a}$, in which R' may be the same or different and is an unsubstituted or substituted alkyl, alkenyl, aryl, arylalkyl or alkylaryl, X is a group hydrolytically condensable from the silicon under hydrolysis conditions while forming a Si—O—Si group or is OH, and a is 0, 1 or 2, or an oligosiloxane or a mixture of such oligosiloxanes obtainable by hydrolytic condensation of this silane/these silanes is charged into any solvent with the exception of water exclusively, whereupon the solution/suspension is brought into contact with an acidic medium, after which the product is separated from the solvent and possibly dried.

H. Method in accordance with one of the points A through G, wherein the formed particles are separated from the solvent and dried.

AA. Use of particles in accordance with one of the points a through m as filler in a crosslinkable resin.

BB. Use in accordance with point AA, wherein the resin can be cured by radiation or by heat.

CC. Use in accordance with point AA, wherein the resin is an acrylate resin or a cyanate resin, the latter being produced using at least one at least difunctional cyanate, and preferably selected from among cyanates of structures I-IV mentioned below:

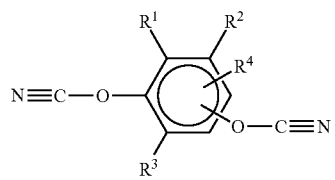
I in which $R^1$ through $R^4$, independently of one another, are hydrogen, $C_1$-$C_{10}$ alkyl, $C_3$-$C_8$ cycloalkyl, $C_1$-$C_{10}$ alkoxy, halogen (F, Cl, Br or I), phenyl or phenoxy, wherein the alkyl or aryl groups may be fluorinated or partially fluorinated,

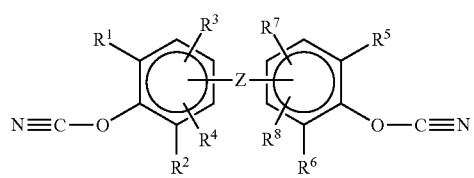
II in which $R^5$ through $R^8$ are like $R^1$ through $R^4$ and Z is a chemical bond, $SO_2$, $CF_2$, $CH_2$, CHF, $CH(CH_3)$, isopropylene, hexafluoroisopropylene, $C_1$-$C_{10}$ alkylene, O, $NR^9$, N=N, CH=CH, COO, CH=N, CH=N—N=CH, alkyleneoxyalkylene with $C_1$-$C_8$ alkylene, S, $Si(CH_3)_2$ or

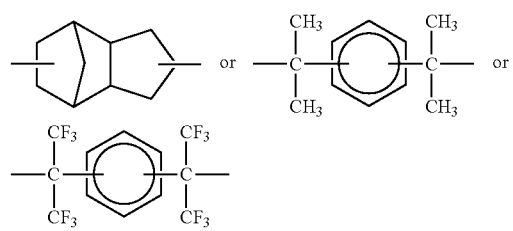

-continued

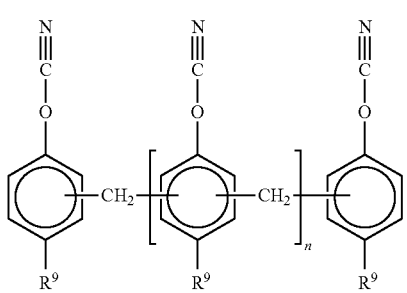
III in which $R^9$ is hydrogen or $C_1$-$C_{10}$ alkyl and n is an integer of 0 to 20, as well as di- or multifunctional aliphatic cyanates with at least one fluorine atom in the aliphatic radical and preferably of structure IV:

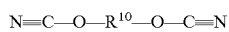
IV in which $R^{10}$ is a divalent organic nonaromatic hydrocarbon with at least one fluorine atom and especially with 3 to 12 carbon atoms, whose hydrogen atoms can be entirely or partially replaced with other fluorine atoms, as well as mixtures of the said cyanates, possibly mixed with other, e.g., monofunctional cyanates and/or with phenols, bisphenols or glycidyl derivatives.

DD. Use of particles in accordance with one of the points a through m as filler in a cured polymer.

EE. Use in accordance with point DD, wherein the polymer is a thermoplastic or a duromer.

FF. Use in accordance with point EE, wherein the duromer is a polycyanate, produced using at least one at least difunctional cyanate, and preferably selected from among cyanates of the structures I-IV mentioned below:

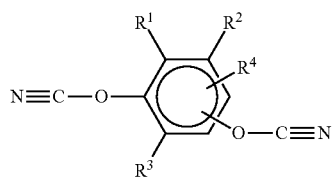
I in which $R^1$ through $R^4$, independently of one another, are hydrogen, $C_1$-$C_{10}$ alkyl, $C_3$-$C_8$ cycloalkyl, $C_1$-$C_{10}$ alkoxy, halogen (F, Cl, Br or I), phenyl or phenoxy, wherein the alkyl or aryl groups may be fluorinated or partially fluorinated,

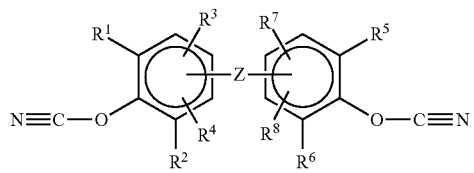
II in which $R^5$ through $R^8$ are like $R^1$ through $R^4$ and Z is a chemical bond, $SO_2$, $CF_2$, $CH_2$, CHF, $CH(CH_3)$, isopropylene, hexafluoroisopropylene, $C_1$-$C_{10}$ alkylene, O, $NR^9$, N=N, CH=CH, COO, CH=N, CH=N—N=CH, alkyleneoxyalkylene with $C_1$-$C_8$ alkylene, S, $Si(CH_3)_2$ or

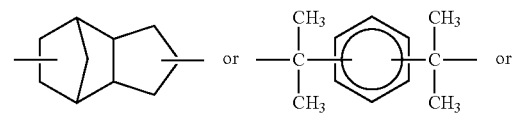

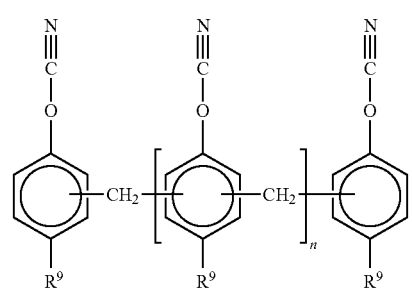
III in which $R^9$ is hydrogen or $C_1$-$C_{10}$ alkyl and n is an integer of 0 to 20, as well as di- or multifunctional aliphatic cyanates with at least one fluorine atom in the aliphatic radical and preferably of structure IV:

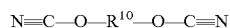
IV in which $R^{10}$ is a divalent organic nonaromatic hydrocarbon with at least one fluorine atom and especially with 3 to 12 carbon atoms, whose hydrogen atoms can be entirely or partially replaced with other fluorine atoms, as well as mixtures of the said cyanates, possibly mixed with other, e.g., monofunctional cyanates and/or with phenols, bisphenols or glycidyl derivatives.

GG. Use of meltable particles in accordance with point m for the production of moldings or coatings.

HH. Use in accordance with point GG, wherein the particles are superhydrophobic.

The invention claimed is:

1. Polysiloxane nanoparticles, prepared from silazanes or open-chained or cyclic polysilazanes in an alkaline environment, comprising:
an average particle size $d_{50}$ (measured using REM recordings) in the range of 10 nm to 200 nm,
a specific surface area $A_o$ of at least 50 m$^2$/g,
a pore volume of at least 0.2 cm$^3$/g and
an average pore diameter $d_{50}$ of at least 0.8 nm,
wherein the nanoparticles have carbon-containing groups, at least some of which are bonded to the silicon in the form of unsubstituted or substituted alkyl or alkenyl groups, wherein the nanoparticles have a portion of, on average, a maximum of 3.5 carbon atoms per silicon atom and wherein to not more than 80% of the silicon atoms, more than one carbon atom is directly bonded, the nanoparticles being meltable.

2. Polysiloxane nanoparticles in accordance with claim 1, wherein the nanoparticles have a contact angle to water of at least about 100°.

3. Polysiloxane nanoparticles in accordance with claim 1, wherein these particles have an average particle size of 70 nm to 130 nm.

4. Polysiloxane nanoparticles in accordance with claim 1, characterized in that the particles have a specific surface area $A_o$ of at least 100 m$^2$/g.

5. Polysiloxane nanoparticles in accordance with claim 1, wherein the nanoparticles are present as agglomerates with a diameter of up to 500 μm.

6. Polysiloxane nanoparticles in accordance with claim 1, wherein the nanoparticles have a pore volume of at least 0.5 cm$^3$/g.

7. Polysiloxane nanoparticles in accordance with claim 1, wherein the nanoparticles have an average pore diameter ($d_{50}$) of at least 1.0 nm.

8. Polysiloxane nanoparticles in accordance with claim 1, wherein to not more than 60% of the silicon atoms, more than one carbon atom is directly bonded.

9. Polysiloxane nanoparticles in accordance with claim 1, wherein the alkyl or alkenyl groups are partially or entirely fluorinated.

10. A crosslinkable resin comprising nanoparticles in accordance with claim 1 as a filler.

11. The crosslinkable resin in accordance with claim 10, wherein the resin can be cured by radiation or by heat.

12. The crosslinkable resin in accordance with claim 10, wherein the resin is an acrylate resin or a cyanate resin, the latter being produced using at least one at least difunctional cyanate
optionally mixed with other cyanates and/or with phenols, bisphenols or glycidyl derivatives.

13. A cured polymer comprising nanoparticles in accordance with claim 1 as a filler.

14. The cured polymer in accordance with claim 13, wherein the polymer is a thermoplastic or a duromer.

15. The cured polymer in accordance with claim 14, wherein the duromer is a polycyanate, produced using at least one at least difunctional cyanate
optionally mixed with other cyanates and/or with phenols, bisphenols or glycidyl derivatives.

16. Method for producing polysiloxane nanoparticles as claimed in claim 1, characterized in that
(a) a silane or a mixture of different silanes with the formula R'$_a$SiX$_{4-a}$, in which R' may be the same or different and is an unsubstituted or substituted alkyl, alkenyl, aryl, arylalkyl or alkylaryl, X is a halogen and preferably Cl, and a is 0, 1 or 2, or an oligosiloxane or mixture of such oligosiloxanes obtainable by hydrolytic condensation of this silane/these silanes is/are charged into any solvent with the exception of water exclusively, whereupon a moist air current is directed through the solution/suspension, after which the product is separated from the solvent and possibly dried, or
(b) a silane or a mixture of different silanes with the formula R'$_a$SiX$_{4-1}$, in which R' may be the same or different and is an unsubstituted or substituted alkyl, alkenyl, aryl, arylalkyl or alkylaryl, X is a group hydrolytically condensable from the silicon under hydrolysis conditions while forming a Si—O—Si group or is OH, and a is 0, 1 or 2, or an oligosiloxane or mixture of such oligosiloxanes obtainable by hydrolytic condensation of this silane/these silanes is/are charged into any solvent with the exception of water exclusively, whereupon the solution/suspension is brought into contact with an acidic medium, after which the product is separated from the solvent and optionally dried.

17. Method for producing polysiloxane nanoparticles as claimed in claim 1, characterized in that
a silazane or a mixture of different silazanes with one or more —[Si(R)(R$^1$)—NR$^2$]— units, in which R and R$^1$ may be the same or different in each individual unit and in various units, if various units are present, and denote an unsubstituted or substituted alkyl or alkenyl, or hydrogen and R$^2$ is hydrogen or alkyl provided that the silazane or silazanes used have a portion, on average, of a maximum of 3.5 carbon atoms per silicon atom overall, wherein
to not more than 80% of the silicon atoms, more than one carbon atom is directly bonded, is charged into a solvent and brought into contact with a highly alkaline medium in such a way that the pH is not below 13 after the addition thereof.

18. Method in accordance with claim 17, wherein the highly alkaline medium is selected from among aqueous potassium hydroxide and sodium hydroxide and the pH is at least 13.0 after the addition.

19. Method in accordance with claim 17, characterized in that the silazane is selected from among cyclic and open-chain silazanes of the formula (V)

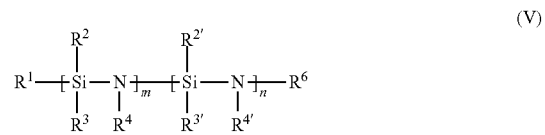

in which
(a) R$^2$ and R$^3$ are the same or different and denote hydrogen or straight-chain, branched or cyclic, substituted or unsubstituted alkyl, alkenyl, aryl, arylalkyl or alkylaryl, wherein each of the substituents R$^2$ and R$^3$ may have a different meaning if m is greater than 1 in various units or has the same meaning, and R$^{2'}$ and R$^{3'}$ are the same or different and denote straight-chain, branched or cyclic, substituted or unsubstituted alkyl, alkenyl, aryl, arylalkyl, alkylaryl or arylalkenyl, in which each of the substituents R$^{2'}$ and R$^{3'}$ may have a different meaning if n is greater than 1 in various units, but preferably has the same meaning,
or
(b) R$^2$ and R$^{2'}$ have the meaning indicated above and, in the presence of at least one radical R$^3$ and of at least one radical R$^{3'}$, all of or some of the radicals R$^3$ and R$^{3'}$ may together represent an unsubstituted or substituted, straight-chain or branched alkylene group with preferably two bridging carbon atoms, wherein optionally the remaining part of the radicals R$^3$ and R$^{3'}$ has the meaning indicated under (a),
and in which
R$^4$ and R$^{4'}$ denote hydrogen or alkyl,
R$^1$ and R$^6$ are the same or different and may have the same meaning as R$^2$ and R$^3$,
wherein R$^6$ may also denote Si(R$^1$)(R$^2$)(R$^3$), or R$^1$ and R$^6$ together represent a single bond,
m is 1, 2, 3, 4, 5, 6, 7, 8, 9, 10 or an integer between 11 and 25,000, and preferably between 11 and 200, and
n is 0, 1, 2, 3, 4, 5, 6, 7, 8, 9, 10 or an integer between 11 and 25,000, and preferably between 11 and 200.

20. Method in accordance with claim 17, characterized in that the formed particles are separated from the solvent and dried.

21. Method in accordance with claim 17, characterized in that the radicals R and R$^1$ are selected from among C$_1$-C$_7$ alkyl and C$_3$-C$_7$ alkylene.

22. Method in accordance with claim 21, characterized in that the radicals R and R$^1$ are selected from among methyl, ethyl and vinyl.

23. Use of meltable nanoparticles in accordance with claim 1 for the production of moldings or coatings, comprising dip coating or spraying the nanoparticles on a structure.

24. Use of meltable nanoparticles in accordance with claim 1 for the production of moldings or coatings, wherein the particles are superhydrophobic, comprising melting the particles, bringing the melt into a die or applying the melt as a coating, and solidifying the melt.

* * * * *

UNITED STATES PATENT AND TRADEMARK OFFICE
CERTIFICATE OF CORRECTION

PATENT NO. : 8,962,138 B2
APPLICATION NO. : 13/377064
DATED : February 24, 2015
INVENTOR(S) : Bauer et al.

It is certified that error appears in the above-identified patent and that said Letters Patent is hereby corrected as shown below:

Title Page, item (57)

In the Abstract, line 13:

...the formula "$R'_xSiX_{4-a}$" or...

should read:

...the formula --$R'_aSiX_{4-a}$-- or...

In the Specification

At column 3, line 14:

...silicon atoms "is [sic, are-Tr.Ed.]" met.

should read:

...silicon atoms --are-- met.

At column 4, line 59:

...the formula "$R_aSiX_{4-a}$[sic- $R'_aSiX_{4-a}$ ?-Tr.Ed.]"...

should read:

...the formula --$R_aSiX_{4-a}$--...

At column 9, line 11:

...the "n-orbitals"...

should read:

Signed and Sealed this
First Day of March, 2016

Michelle K. Lee
*Director of the United States Patent and Trademark Office*

CERTIFICATE OF CORRECTION (continued)
U.S. Pat. No. 8,962,138 B2

...the --π-orbitals--...

At column 10, line 21:

...of "100 m [sic-Tr.],"...

should read:

...of --100 m,--...

At column 10, line 34:

...of "100 m [sic-Tr.],"...

should read:

...of --100 m,--...

At column 13, lines 23-24:

The yield of "n-octadecylpolysiloxane [sic, typo in original-Tr.Ed.]" nanoparticles...

should read:

The yield of --n-octadecylpolysiloxane-- nanoparticles...

At column 15, lines 6-9:

Then, the precipitate is suctioned off via a G4 "rewashed with acetone, [sic-and]" the powder obtained is dried overnight at 50°C in the drying cabinet.

should read:

Then, the precipitate is suctioned off via a G4 --frit, rewashed with acetone, and-- the powder obtained is dried overnight at 50°C in the drying cabinet.

At column 16, lines 4-13:

"h. Polysiloxane nanoparticles in accordance with one of the above points, wherein more than one carbon atom directly bonded to no more than 60%, and preferably to no more than 40% of the silicon atoms is present.
i. [sic, missing, sequence out of order in original-Tr.]
j. Polysiloxane nanoparticles in accordance with one of the above points with a portion of, on average, a maximum of 3.5 carbon atoms per silicon atom and/or wherein more than one carbon atom directly bonded to no more than 80% of the silicon atoms is present."

should read:

--h. Polysiloxane nanoparticles in accordance with one of the above points, wherein more than one carbon atom directly bonded to no more than 60%, and preferably to no more than 40% of the silicon atoms is present.

j. Polysiloxane nanoparticles in accordance with one of the above points with a portion of, on average, a maximum of 3.5 carbon atoms per silicon atom and/or wherein more than one carbon atom directly bonded to no more than 80% of the silicon atoms is present.--

In the Claims

In Claim 16, Column 21, lines 48-49:

b) a silane or a mixture of different silanes with the formula "$R'_a SiX_{4-1}$," in which R' may be the same or different...

should read:

b) a silane or a mixture of different silanes with the formula --$R'_a SiX_{4-a}$,-- in which R' may be the same or different...